United States Patent [19]
Engel

[11] 3,741,505
[45] June 26, 1973

[54] AERODYNAMIC DECELERATOR
[75] Inventor: Roger K. Engel, Sioux Falls, S. Dak.
[73] Assignee: Raven Industries, Inc., Sioux Falls, S. Dak.
[22] Filed: Mar. 8, 1971
[21] Appl. No.: 121,702

[52] U.S. Cl. .............................................. 244/145
[51] Int. Cl. .......................................... B64d 17/02
[58] Field of Search ............................ 244/142, 145

[56] References Cited
UNITED STATES PATENTS
3,429,532  2/1969  Sepp .................................. 244/145

FOREIGN PATENTS OR APPLICATIONS
1,102,665  2/1968  Great Britain ...................... 244/145

Primary Examiner—Milton Buchler
Assistant Examiner—Jesus D. Sotelo
Attorney—Hill, Sherman, Meroni, Gross & Simpson

[57] ABSTRACT

A parachute construction having a parachute canopy with load lines extending downwardly therefrom for attachment to a load with the canopy formed of a fabric of random oriented nylon filaments self-bonded at the filament junctions and may be calendered to a predetermined porosity.

3 Claims, 4 Drawing Figures

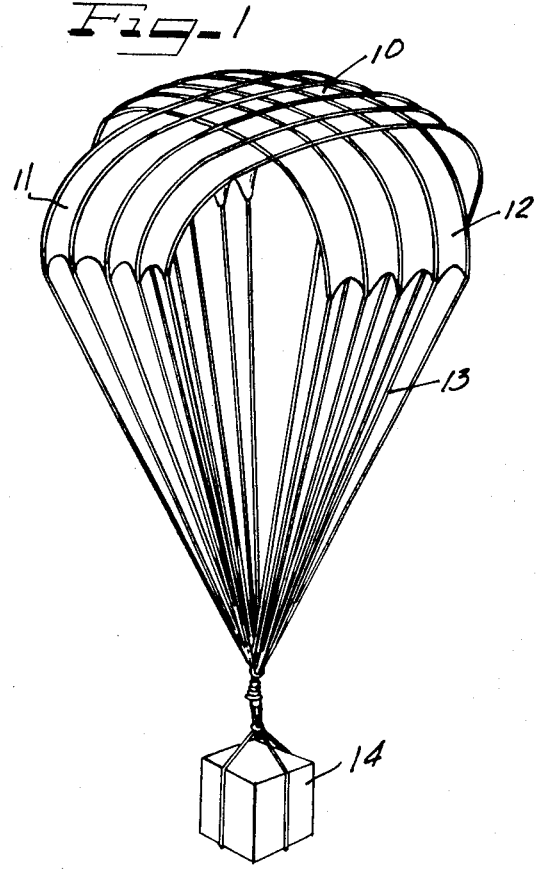
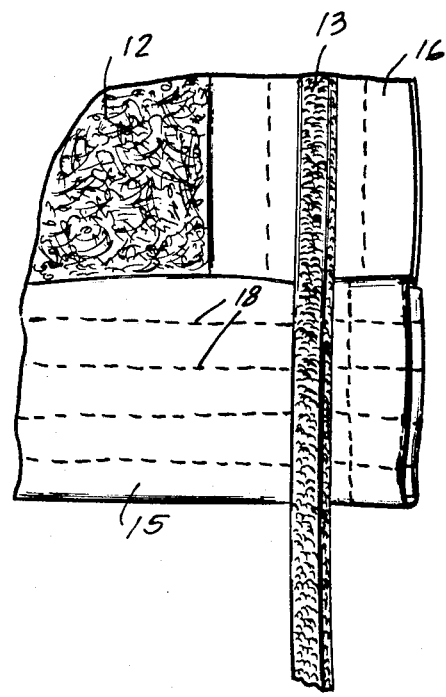
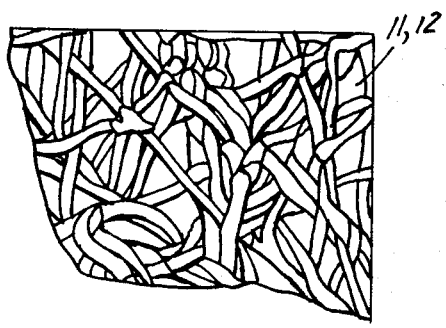
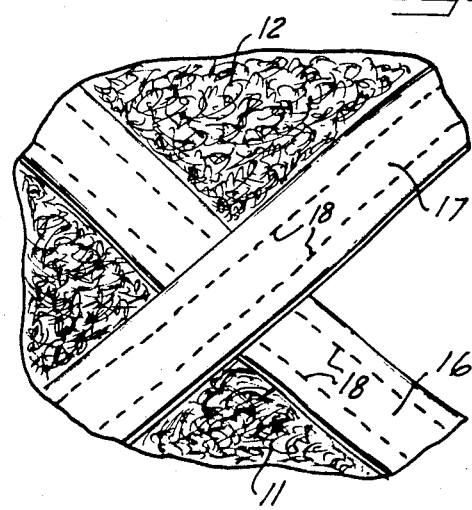
INVENTOR.
ROGER K. ENGEL

AERODYNAMIC DECELERATOR

BACKGROUND OF THE INVENTION

The present invention relates to an improved parachute formed of a material which uniquely affords advantages in substantially each of the functional areas required for improved parachute operation. The parachute is particularly well adapted for use in cargo parachute structures and may be used in other arrangements where parachutes are employed.

In determining the strength required for material for a parachute canopy, the stresses at initial opening are of prime significance. Once the parachute is opened, the strength required for carrying the load as the parachute floats to earth is substantially less and need not receive consideration. To enable a parachute material to take the shock of opening, it is necessary that it possess high tearing and bursting strength or the capacity for absorbing shock loads. Particularly in cargo chutes, it is necessary that these properties be possessed both in the dry and wet state.

A further characteristic which affects the opening strength of a parachute canopy is its air permeability. For different deployment circumstances, where deployment is made at high or low speed, the demands of the material vary, and it is important that the desired permeability can be obtained.

A further requirement of a parachute involves its construction and manufacture in that it must be capable of being made with mass-production techniques and being capable of being made without the inherent introduction of substantial errors in manufacture. This is particularly necessary in an expendable parachute such as used for munitions or other cargo drops and for flare drops.

A further feature important to parachute operation and deficient in structures heretofore available is the recovery capability of the material when stretched. Good elastic recovery is essential for the parachute to retain its dynamic properties and high elasticity is beneficial in withstanding shock recovery upon deployment. A feature of importance to parachutes to be carried in aircraft is minimum packing volume which is afforded by a material of high density for a given weight and strength. Initial low cost is desirable as well as a long life cycle for parachutes which must be reused.

It is accordingly an object of the present invention to provide an improved parachute structure which affords the above capabilities and advantages which were either not present in parachutes heretofore available or were present to a lower degree.

It is an object of the present invention to provide a parachute wherein the canopy has properties whereby the permeability can readily be controlled and varied without necessarily changing the type, weight and strength of the material so that a single material can serve for a great many parachute performance variations.

A further object of the invention is to provide an improved parachute wherein the material has good dimensional stability even at high temperatures, wherein the material is relatively inexpensive and superior in the handling, cutting and sewing and other fabricating procedures.

A further object of the invention is to provide an improve parachute wherein the chute has a superior capacity for absorbing shock loads and wherein the material is relatively elastic and increases in air permeability with initial opening, but has an unusually high elastic recovery.

Other objects, advantages and features will become more apparent with the teaching of the principles of the present invention in connection with the disclosure of the preferred embodiments thereof in the specification, claims and drawings in which:

DESCRIPTION OF THE DRAWINGS

FIG. 1 is a side elevational view of a parachute configuration constructed in accordance with the principles of the present invention;

FIG. 2 is a greatly enlarged frequency view illustrating the construction of the material of the parachute canopy;

FIG. 3 is a detailed fragmentary plan view of a corner of the canopy showing the attachment of a suspension line; and FIG. 4 is a fragmentary plan view showing a construction of a portion of the canopy.

DESCRIPTION OF THE PREFERRED EMBODIMENTS

The invention pertains to an improved material which may be employed in parachutes in various shapes and forms. The material is particularly advantageous in a preferred form and shape shown herein, but is not limited to that specific shape.

As illustrated in FIG. 1, a parachute canopy 10 is formed of first and second rectangular panels 11 and 12 which are arranged at right angles to each other. At the lower ends of the panels, load lines 13 extend downwardly to support a payload 14. In the case of a cargo parachute, the parachute may be deployed from an airplane, and the payload may be supplies or ammunition, or the parachute may be put to other uses, such as, for dropping battle field flares. The load lines may be suitably attached to the ends of the panels or may be arranged so that they are looped over the panels to help distribute the weight of the load over the material of the canopy. The rectangular panels 11 and 12 may be attached in various ways, but, as shown in FIGS. 3 and 4, webbing 15, 16 and 17 may be attached along the edges of the panels and sewn to the material by stitching 18. As shown in FIG. 3, the load lines 13 are sewn to the webbing.

The material of the panels 11 and 12 is shown somewhat in detail in FIG. 2. Instead of being formed of a woven material which has heretofore been the case with relatively high strength parachute materials, it is formed of a non-woven fabric of a particular construction. The fabric is formed of random oriented nylon filaments which are self-bonded to each other in the absence of fillers and binders. A preferred type of filament is 100 percent nylon, known to the art as 6, 6 nylon. The filaments are self bonded containing no extraneous binder or finishes and formed in their random orientation into the fabric by various ways such as by a continuous operation that involves extruding and carrying the fibers in an activating gaseous medium against a porous collecting surface. The fibers are carried on the collecting surface being self-bonded and either immediately or in a subsequent operation, may be calendered.

It will be understood that while special advantages including control of porosity are obtained by calendering and that the structure and method including calendering are an important part of the invention, use of the material as described without calendering is within the scope of the concepts disclosed herein.

It should also be understood that the principles of the calendering process in the manufacture of parachute material are not to be limited to the specific material described, but may be employed with other non-woven materials where calendering affects the porosity and performance of the parachute.

The calendering process takes place by passing the fabric web through the nip of a pair of calendering rollers to aid the bonding and to control the porosity of the fabric. The porosity is controlled by passing the fabric successively through additional nips, or by increasing the pressure in the nips or adding heat to increase the temperature of the fabric as it passes through the calendering nips. The amount of calendering required can be readily determined by testing the porosity of the resultant product and increasing or decreasing pressures and temperatures and number of calendering nips. This calendering process can be accomplished by equipment conventionally used for calendering fabric material and from 2 to 4 nips with nip pressures of 500 to 1200 pounds per lineal inch at temperatures of room temperature to 440°F (225°C). (Preferred range 250°F to 350°F.)

In a preferred form a filament of approximately 4.5 denier may be employed, although this may be increased or decreased as may the density of the random distribution of filaments be changed. Material in the range of 0.5 ounce per square yard to 6.0 ounce per square yard may be preferably employed for a typical parachute. In the calendering process, dependent upon the permeability desired for optimum parachute characteristics and stable strength to sustain opening load shock, the fabric may be calendered to an average air permeability ranging from 900 cubic feet per minute per square foot to 35 cubic feet per minute per square foot (at 0.5 inches $H_2O$ pressure).

As an example of the range of air permeability which can be obtained by calendering, with the subject material having a weight of 0.85 ounces per square yard, an initial lightly calendered porosity will exist of 740 cubic feet per minute per square foot, and depending upon the amount of calendering, the porosity may be readily brought down to any desired porosity to 250 cubic feet per minute per square foot, or less.

The nylon 6, 6 fibers are of the form prepared from hexamethylene diamine and adipic acid or its derivatives with a melting point on the order of 472°F.

The physical requirements of a type of specimen is in accordance with the following typical example:

| | |
|---|---|
| Weight, ounce per square yard (max.) | 1.20 |
| Breaking strength, pounds (min.) | |
|   Machine direction | 24.0 |
|   Transverse direction | 14.0 |
| Tearing strength, pounds (min.) | |
|   Machine direction | 13.0 |
|   Transverse direction | 6.0 |
| Elongation, percent (min.) | |
|   Machine direction | 20 |
|   Transverse direction | 20 |
| Air permeability (CFM of air per square foot of fabric) | 200 ± 50 |

Directional breaking tearing strengths and elongation are variable and can be made equally strong in either direction by adjustment of the forming machinery.

A canopy formed of this material provides excellent tensile properties in both the dry and wet state, possesses high strength and elongation, high tearing and bursting strength, a long flexible life, high elastic recovery and great toughness, which contributes to a high capacity for absorbing shock loads. A significant advance over woven fabrics is that the stresses occurring in parachute use are distributed omnidirectional, whereas in conventional material, they are distributed in only two directions. The advantage is that stress is distributed among the random oriented fibers rather than in just two directions as in woven cloths.

A very important advantage is the controlled permeability obtainable through calendering. The material provides substantially any permeability desired within a given envelope. On conditions of use which involve high initial opening shock, by reducing the amount of calendering, the permeability can be increased to an exact desired amount. This is impossible with conventional woven cloth. Other factors which must be controlled by parachute design include the trajectory. For example, where the parachute carries fragile material, the landing velocity, i.e., the velocity of which hits the ground must be less than where a nonfragile payload is carried. This landing velocity determines the parachute's size. With a given size which has been determined by landing velocity and weight carried, the designer attempts to design for as low strength as possible to obtain a light as possible parachute to reduce packing volume and reduce cost. In parachute velocities heretofore available, the strength required for initial shock load was a limiting factor. With the present improved parachute canopy, the capability of varying permeability permits change in parachute size so that all optimum factors can be achieved in design. This can be easily done by formula or by computer design, and a variation in factor is achievable which was not possible heretofore in parachute design.

In addition to controlling permeability, a factor achieved by a canopy of the present construction is that elastic elongation occurs which allows more air through upon opening, but an excellent recovery ratio is present. For example, material of the construction described elongates up to 35 percent and has an average of 92 percent recovery. Thus, a greater porosity exists under the high stress of the opening or deployment, and when less stress occurs as the parachute floats down, the recovery of the material reduces its porosity. Therefore, in an actual design of this parachute, there are three variables, i.e., size, initial permeability, and maximum permeability with a shock elongation, whereas, the sole variable present in canopies heretofore available was the variable of size.

The air permeability factors referred to above are at pressure differentials of 0.5 inches $H_2O$.

The random oriented non-woven nylon fiber fabric described above can readily be folded and packed in containers and canisters for parachute transport. The material has substantial nonraveling stability, and it is easy and quick to lay up and sew and seam.

As an example of a parachute tested utilizing material having a weight of 1.0 ounce per square yard, the following factors were noted:

| | |
|---|---|
| Parachute weight: | 16.6 pounds |
| Parachute packed volume: | 0.625 cubic foot |
| Payload weight: | 525 pounds |
| Drop altitude: | 2000 feet. A.G.L. (3800 N.S.L.) |
| Air density: | $2.1882 \times 10^{-3}$ slug/cu ft. |
| Descent time: | 71 seconds |
| Descent velocity: | 28.6 fps. |

The fabric can be formed in various ways known to those skilled in the art. For example, the polyamid fibers may be deposited before formation on a traveling porous surface in a continuing operation employing an activating gaseous medium such as hydrogen chloride gas to promote the bonding. The calendering will follow.

Thus, we have provided an improved parachute construction which meets the objectives and advantages above set forth.

I claim as my invention:

1. The method of forming a parachute which comprises providing a material formed of random oriented non-woven nylon fibers bonded to each other, subjecting the material to a calendering process reducing the air permeability to a predetermined amount, forming the material into a shape to provide a parachute canopy and attaching load lines to the canopy for suspension of a load therefrom.

2. The method of forming a parachute in accordance with claim 1 wherein the calendering is continued to reduce the air permeability to a range of 900 cubic feet per minute per square foot to 35 cubic feet per minute per square foot.

3. A parachute comprising in combination:

a parachute canopy formed of an elastic material having a high elastic recovery, said canopy material being formed of random oriented non-woven fibers of nylon wherein the fibers are self-bonded, said material being calendered to an air permeability in the range of 900 cubic feet per minute per square foot to 35 cubic feet per minute per square foot, the material having a weight in the range of 0.5 ounce to 6.0 ounce per square yard;

and load lines extending downwardly from the canopy for supporting a load therefrom.

* * * * *